(12) United States Patent
Klatt

(10) Patent No.: US 6,592,031 B1
(45) Date of Patent: Jul. 15, 2003

(54) AUTHENTICATION SYSTEM FOR PC CARDS

(75) Inventor: Dieter Klatt, Wülfrath (DE)

(73) Assignee: Stocko Contact GmbH & Co. KG (DE)

( * ) Notice: Subject to any disclaimer, the term of this patent is extended or adjusted under 35 U.S.C. 154(b) by 0 days.

(21) Appl. No.: 09/454,888

(22) Filed: Dec. 3, 1999

(30) Foreign Application Priority Data

Dec. 4, 1998 (DE) .......................................... 298 21 644

(51) Int. Cl.[7] ................................................. G06K 5/00
(52) U.S. Cl. ....................... 235/382; 235/479; 235/486; 235/492; 902/3
(58) Field of Search ............................. 235/380, 382, 235/492, 486, 384, 479, 472; 382/124, 128; 902/3; 705/18, 41, 44

(56) References Cited

U.S. PATENT DOCUMENTS

| | | | | |
|---|---|---|---|---|
| 4,202,120 A | * | 5/1980 | Engel .................. | 340/146.3 E |
| 4,253,086 A | * | 2/1981 | Szwarcbier .......... | 340/146.3 E |
| 4,455,083 A | * | 6/1984 | Elmes .................. | 356/71 |
| 4,575,621 A | * | 3/1986 | Dreifus ................ | 235/380 |
| 4,582,985 A | * | 4/1986 | Löfberg ............... | 235/380 |
| 5,180,901 A | * | 1/1993 | Hiramatsu ........... | 235/380 |
| 5,375,037 A | * | 12/1994 | Le Roux ............. | 235/492 |
| 5,623,552 A | * | 4/1997 | Lane ................... | 235/492 |
| 5,752,857 A | * | 5/1998 | Knights ............... | 235/380 |
| 5,780,827 A | * | 7/1998 | Zolkos et al. ....... | 235/441 |
| 5,801,367 A | * | 9/1998 | Asplund et al. ..... | 235/384 |
| 5,827,179 A | | 10/1998 | Lichter et al. ....... | 600/300 |
| 5,877,488 A | * | 3/1999 | Klatt et al. .......... | 235/486 |
| 5,880,452 A | * | 3/1999 | Plesko ................. | 235/472 |
| 5,920,640 A | * | 7/1999 | Salartino et al. .... | 382/124 |
| 5,923,082 A | * | 7/1999 | Takemura ............ | 235/492 |
| 5,955,722 A | * | 9/1999 | Kurz et al. .......... | 235/479 |
| 6,003,135 A | * | 12/1999 | Bialick et al. ...... | 713/201 |
| 6,069,795 A | * | 5/2000 | Klatt et al. .......... | 235/492 |
| 6,078,265 A | * | 6/2000 | Bonder et al. ....... | 382/124 |
| 6,088,802 A | * | 7/2000 | Bialick et al. ...... | 713/200 |
| 6,128,194 A | * | 10/2000 | Francis ................ | 235/492 |
| 6,168,077 B1 | * | 1/2001 | Gray et al. .......... | 235/375 |
| 6,173,405 B1 | * | 1/2001 | Nagel .................. | 713/200 |
| 6,213,403 B1 | * | 4/2001 | Bates, III ............ | 235/492 |
| 6,219,439 B1 | * | 4/2001 | Burger ................. | 235/382 |

FOREIGN PATENT DOCUMENTS

| | | | |
|---|---|---|---|
| DE | 196 48 767 | * | 6/1997 |
| DE | 196 45 937 | * | 5/1998 |
| DE | 197 16 694 | | 10/1998 |
| DE | 298 14 427 U | | 1/1999 |
| JP | 2001-037934 | * | 2/1989 |
| JP | 2001-152590 | * | 6/1989 |
| JP | 11-025246 | * | 1/1999 |
| JP | 11-195102 | * | 7/1999 |
| JP | 2000-048177 | * | 2/2000 |
| JP | 2000-148963 | * | 5/2000 |
| JP | 2000-182025 | * | 6/2000 |
| WO | 1998-12670 | * | 3/1998 |
| WO | WO 98 38 567 | | 9/1998 |
| WO | 1999-38112 | * | 7/1999 |
| WO | 2000-10134 | * | 2/2000 |
| WO | 00/21439 | * | 4/2000 |
| WO | 00/68898 | * | 11/2000 |

OTHER PUBLICATIONS

JAPIO, Ref. 98–269145 zu JP 10269145 A.

* cited by examiner

Primary Examiner—Thien M. Le
Assistant Examiner—Uyen-Chau N Le
(74) Attorney, Agent, or Firm—R W Becker & Associates; R W Becker

(57) ABSTRACT

A PC card authentication system has a PC card having a PC card housing with a plug connector at one end thereof configured to be inserted into a computer slot of a computer and to provide electrical contact with the computer. Electronic components are mounted in the PC card housing and are connected to the plug connector. A sensor is provided for detecting biometric data of a person for the purpose of authenticating the identity of a person.

15 Claims, 5 Drawing Sheets

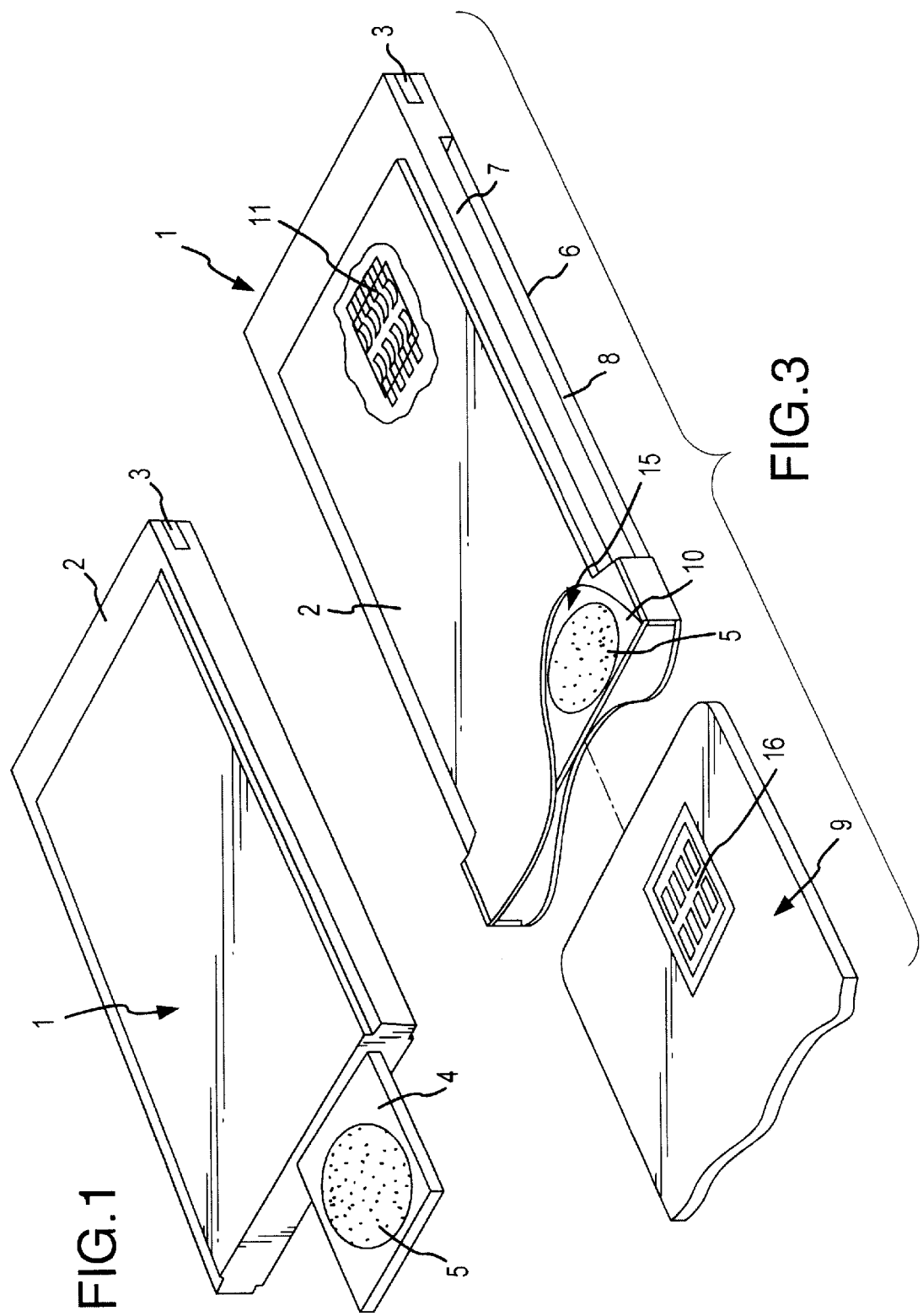

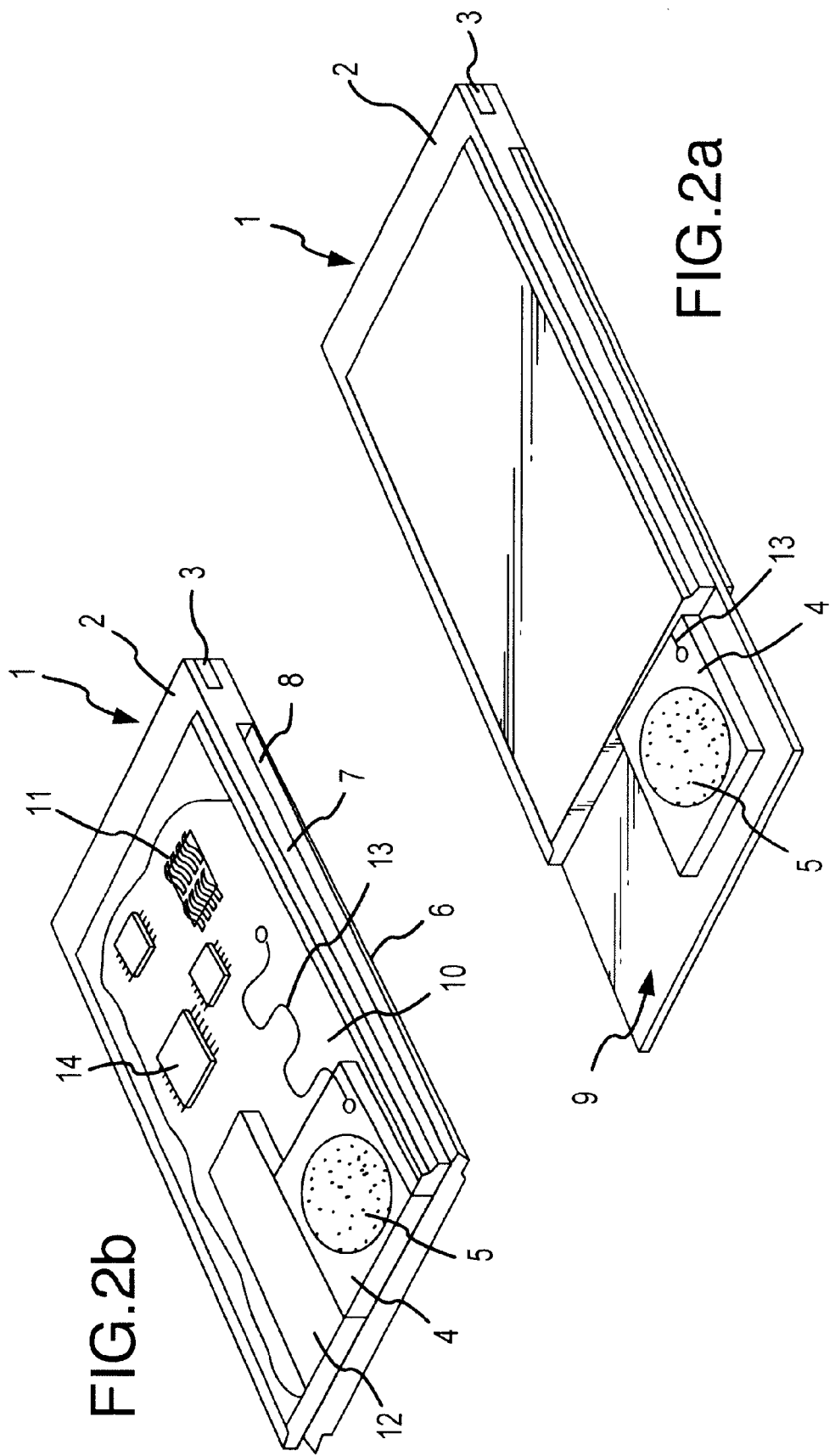

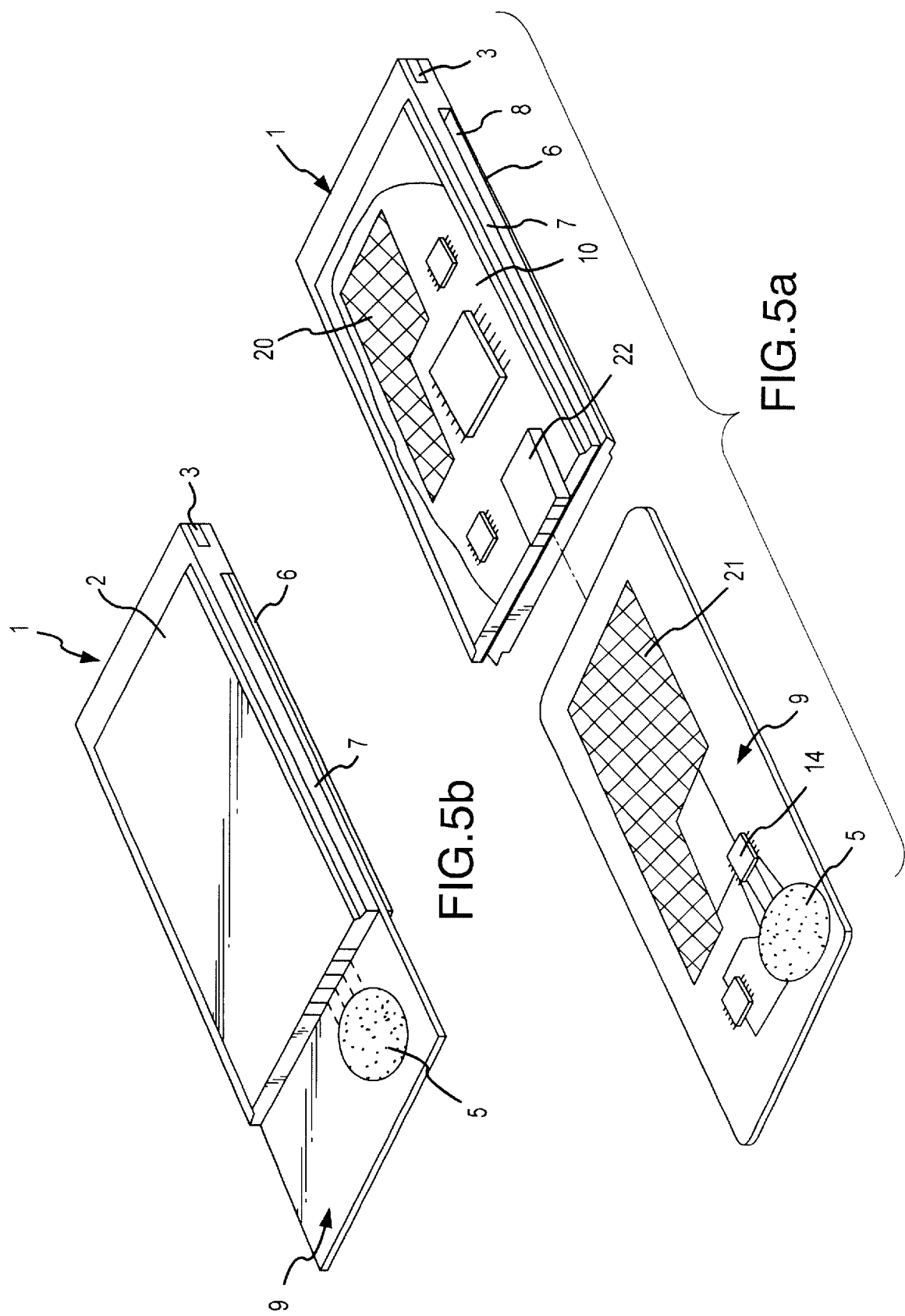

AUTHENTICATION SYSTEM FOR PC CARDS

BACKGROUND OF THE INVENTION

The invention relates to an authentication system for PC cards, especially according to the PCMCIA standard, comprised of a housing shaped like a plug-in card for receiving electronic components such as a chip card reader, a memory expansion, a drive, or a modem wherein the housing is provided at one end thereof with a plug connector for electrically connecting the PC card to a computer.

Because of increased mobility in the area of computer technology, PC cards are used more often since they provide variability and transportability. These PC cards are card-shaped support elements for electronic components which are, in general, standardized according to the PCMCIA standard and, depending on the application, are embodied e.g. as memory expansions, drives, modems, or chip card readers. The connection to a computer, such as a notebook or an electronic organizer, is realized via a plug connector in strip form which provides an electrical connection via a PCMCIA port of the computer by mechanical and electrical contacting.

Especially the use of PC cards as readers for chip cards has become more and more common. This is so because the chip cards as so-called smart cards are used increasingly for identity checks. These applications relate especially to the area of on-line banking, such as Internet banking according to the HBCI standard, pay TV, or access control to data networks. The identification and authorization for authorized users can be initiated in connection with a code number such as a PIN to be input by the user.

A relatively high safety can be achieved when the smart card not only serves as an identification for the user but at the same time encodes data to be transmitted, for example, via the Internet. Depending on the encoding method, for example, with a 56 bit or 128 bit key, a relatively great data protection is provided against unauthorized access and recording of the data transmission for the purpose of gaining access to information such as PIN, credit card numbers, etc.

With the increasing use of transportable computers, for example, notebooks or electronic personal organizers, there is a technical need to improve the authentication of PC cards. Even though, as mentioned above, password methods and methods with smart cards can be used in connection with an encryption system, which methods provide a relatively high safety when transmitting data, the check of user authenticity still needs to be improved. This is so especially in connection with mobile applications which are especially susceptible to the risks of theft or unauthorized recording of a PIN.

It is therefore an object of the present invention to provide an authentication system for PC cards which provides ease of use while reliably preventing access of unauthorized persons.

SUMMARY OF THE INVENTION

This object is inventively solved with an authentication system of the aforementioned kind in that a sensor for detecting biometric data is provided with which the authenticity of a person or groups of persons can be detected.

The inventive authentication system ensures a simple handling which takes into consideration especially the requirements of mobile application of PC cards. This is so because a unique and substantially fraud-proof identification of the user can be provided simply and rapidly by a sensory detection of biometric data such as a fingerprint or the human retina. Access by unauthorized persons is thus prevented because of the individual features of the biometric data even in the case of theft.

In a preferred design of the invention the PC card housing has a bottom plate and a cover plate which is at least in the transverse direction congruent to the bottom plate, wherein between the two plates an insertion channel for receiving a chip card is defined which opens at an end of the housing opposite the plug connector. A printed circuit board extending parallel to the insertion channel within the housing is electrically connected to the plug connector and provided at its surface with a contact element for contacting the chip card. A PC card of this configuration serves as a chip card reader and, when using smart cards, allows the encoding of data, for example, with a key based on the detected biometric data.

According to another advantageous embodiment of the invention, the sensor is arranged on a slide which can be reciprocated in and out of the housing and which is positioned preferably at the end of the housing opposite the plug connector. This has the advantage that the sensor is accessible only when needed for an authenticity check and, when not in use, is positioned and protected within the PC card housing. This configuration takes into consideration the mobile use as well as the desired controlled identification function in that, for example, the sensor is extended from the housing only when a chip card has been inserted. It is furthermore advantageous to provide the slide with a preferably electrically driven linear guide in order to realize precise guiding and automatic control of the slide.

Expediently, the top side of the chip card inserted into the insertion channel has a guide path for the slide so that, when the slide is extended from the housing, the chip card provides a mechanical support. This is especially beneficial in connection with the robust embodiment of a PC card for mobile applications. It is furthermore expedient to connect the sensor electrically to the circuit board in order to provide in a simple and reliable manner data exchange with the computer connected via the plug connector to the PC card. The electrical connection to the circuit board can be realized in a manner known to a person skilled in the art by a cable or a conductive connecting foil.

According to a further advantageous embodiment of the invention, the sensor is arranged on the printed circuit board and is exposed within a cutout provided at the housing. This design is especially advantageous since it provides a simple and inexpensive manufacture. The cutout is ergonomic and constructively simple when it is embodied as a recessed end face edge of the cover plate of the housing so that the printed circuit board arranged underneath is exposed.

In an alternative embodiment of the invention, the sensor is arranged on the chip card so that conventional PC cards can be used in connection with the inventive concept. A simple electric connection of the sensor to the printed circuit board or the computer connected thereto can be achieved in that the sensor is electrically connected to a contact element provided on the chip card. Upon insertion of the chip card into the insertion channel, the contact element provides contact to the printed circuit board with or without physical contact. The contact element in this context may be a contact element that is already present on chip cards or an additional contact element. The connection of the sensor to the contact element is preferably realized by a conductive foil which is arranged in the interior of the chip card, for example, by potting. The contacting of the contact element of the chip card with the printed circuit board can be realized in a manner known to a person skilled in the art, for example, by spring contacts or in a contact-free manner, for example, by radio-technological or opto-electronic coupling. According to an alternative further development of the invention, the sensor is electrically connected to the contact element arranged on the chip card. The contact element is coupled with a sending and receiving unit by opto-electrical and/or radio-technological coupling, wherein the sending and receiving unit is provided at the end of the housing unit opposite the plug connector. In this manner, the sensor can be operated even when the chip card has not yet been inserted, for example, in that an infrared connection (according to IRDA standard) is provided between the sending and receiving unit at the end of the housing and the sensor positioned on the chip card.

In a further embodiment of the invention the sensor and/or the slide can be activated or deactivated by a certain position of the chip card in the insertion channel, by electrical contact of the PC card with the computer, and/or by electrical signals of the computer. In this manner it is, for example, possible to move the slide completely out of the housing only when the chip card is completely inserted into the insertion channel of the housing and to retract the slide automatically into the housing upon removal of the chip card. The position of the chip card can be determined by limit switches or movement switches. It is also possible to control the sensor by signals of the connected computer so that a controlled detection of biometric data can be achieved.

In order to provide an autonomous energy supply, as is especially needed for mobile use, according to a further feature of the invention the sensor and/or the slide are supplied with electrical energy by a battery or a storage capacitor arranged in the housing. Finally, it is suggested to connect the sensors to a cryptographic processor for encoding and decoding detected data. The processor is preferably arranged on the printed circuit board or the chip card. The use of a processor for encoding/decoding data allows the use of complex cryptographic systems and thus provides increased safety and protection.

BRIEF DESCRIPTION OF THE DRAWINGS

The object and advantages of the present invention will appear more clearly from the following specification in conjunction with accompanying drawings, in which:

FIG. 1 is a perspective view of a PC card with the slide in the extended position;

FIG. 2a shows a perspective representation of a PC card embodied as a chip card reader with the extended slide resting on the chip card;

FIG. 2b shows a perspective view of the PC card according to FIG. 2a with the chip card removed and the housing shown partially broken away;

FIG. 3 is a perspective view of an alternative PC card embodied as a chip card reader having the sensor arranged on the printed circuit board;

FIG. 5a shows a perspective view of a further alternative PC card embodied as a chip card reader having a sensor arranged on the chip card and providing radio-technological or opto-electronic coupling between chip card and PC card; and FIG. 5b shows a perspective view of the PC card of FIG. 5a with inserted chip card.

DESCRIPTION OF PREFERRED EMBODIMENTS

Figure 4A:
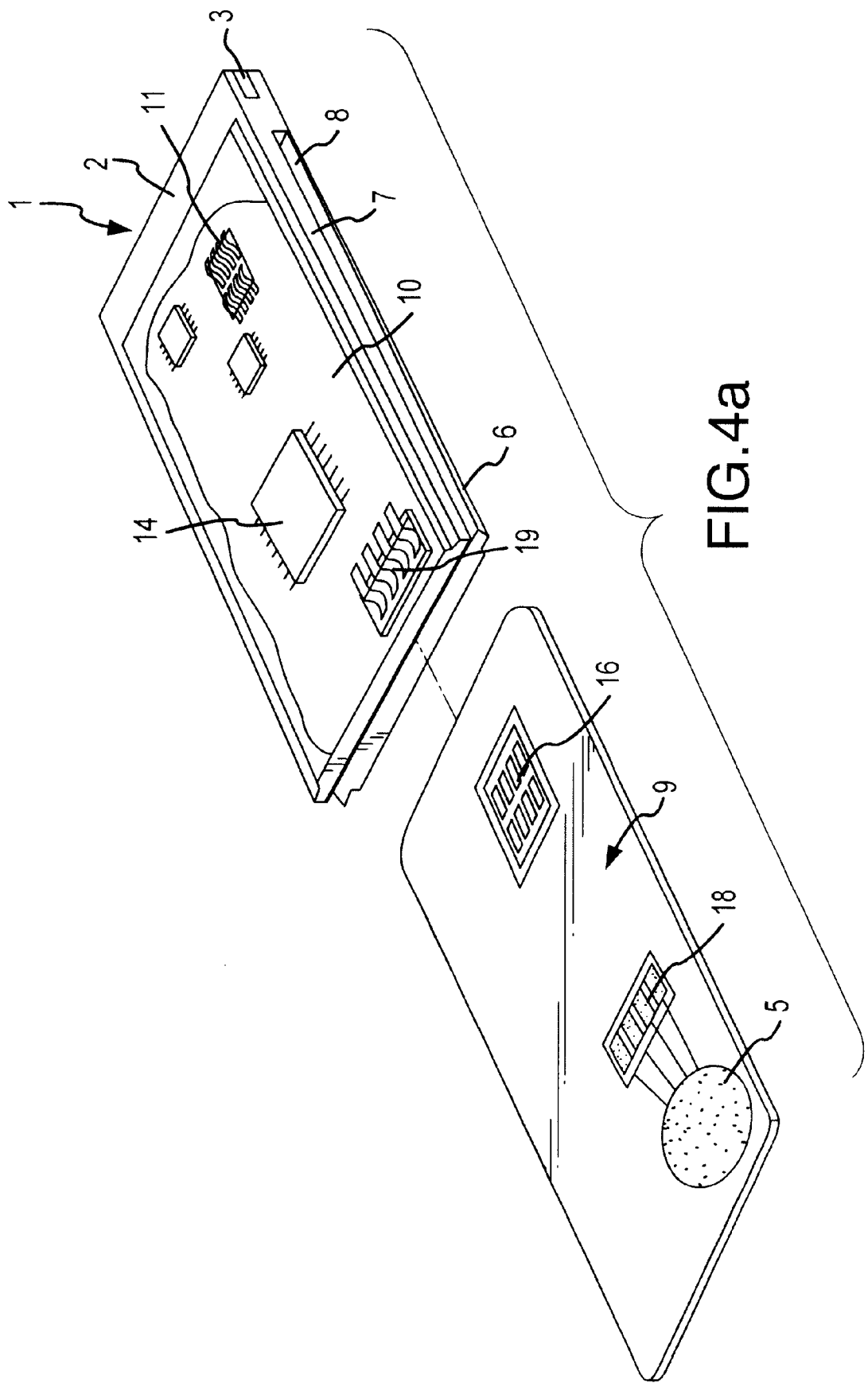
FIG. 4a shows a perspective view of a further alternative PC card embodied as a chip card reader with partially cut away housing and sensor arranged on the chip card.

The present invention will now be described in detail with the aid of several specific embodiments utilizing FIGS. 1 through 5b.

FIG. 1 shows a PC card 1 according to the PCMCIA standard type 11. The PC card 1 has a housing 2 having at one end a plug connector 3 in strip form for electrically connecting the PC card to a standardized PCMCIA interface of a computer such as a notebook or an electronic personal organizer. At the opposite end of the housing 2 a slide 4 is provided that can be reciprocated and has mounted thereon a sensor 5 for detecting biometric data, for example, fingerprints or the human retina. The slide, which is comprised of plastic or metal depending on the respective application, has an embedded sensor 5 which in the shown case is a foil designed to detect a fingerprint. The PC card 1 shown in FIG. 1 can be designed, for example, as a modem for connecting to the hard-wired telephone network or to the GSM network (Global System for Mobile telecommunications).

In comparison, FIGS. 2a and 2b show a PC card 1 that is embodied as a chip card reader and has a housing 2 comprised of a bottom plate 6 and a congruent cover plate 7. Between the two plates 6 and 7 an insertion channel 8 for receiving a chip card 9 is embodied which opens at the end of the housing 2 opposite the plug connector 3. As can be seen especially in the representation of FIG. 2 in which parts of the housing 2 are cut away, the interior of the housing 2 has a printed circuit board 10 parallel to the insertion channel 8. The board 10 comprises a contact field 11 embodied as spring contacts for contacting the chip card 9. Furthermore, an electrical drive 12 is arranged on the printed circuit board 10 for driving the slide 4. The electrical drive 12 at the same time provides a guide for the slide 4. FIG. 2b also shows that the slide 4 is electrically connected to the printed circuit board 10 via an elastic electric cable 13. On the printed circuit board 10 a cryptographic processor 14 is also mounted which is used for encoding or decoding the biometric data detected by the sensor 5. FIG. 2a shows also that the top side of the chip card 9 provides a guide path or support for the slide 4 when it is extended from the housing 2.

The PC card 1 represented in FIG. 3 is also embodied as a chip card reader. In contrast to the chip card reader of FIGS. 2a and 2b, the PC card 1 according to FIG. 3 does not have a slide 4. The sensor 5 for detecting biometric data is instead directly mounted on the printed circuit board 10. The cover plate 7 is provided with a cutout 15 in the area of the sensor 5. The cutout 15 in the shown embodiment is formed by a recess at the end face of the cover plate 7 at the side opposite the plug connector 3. The printed circuit board 10 arranged underneath the recess is exposed. FIG. 3 also shows that the chip card 9 has an areal contact field 16 that electrically and mechanically contacts the contact field 11 arranged at the bottom side of the printed circuit board 10 when the chip card 9 is inserted into the insertion channel 8.

Figure 4B:
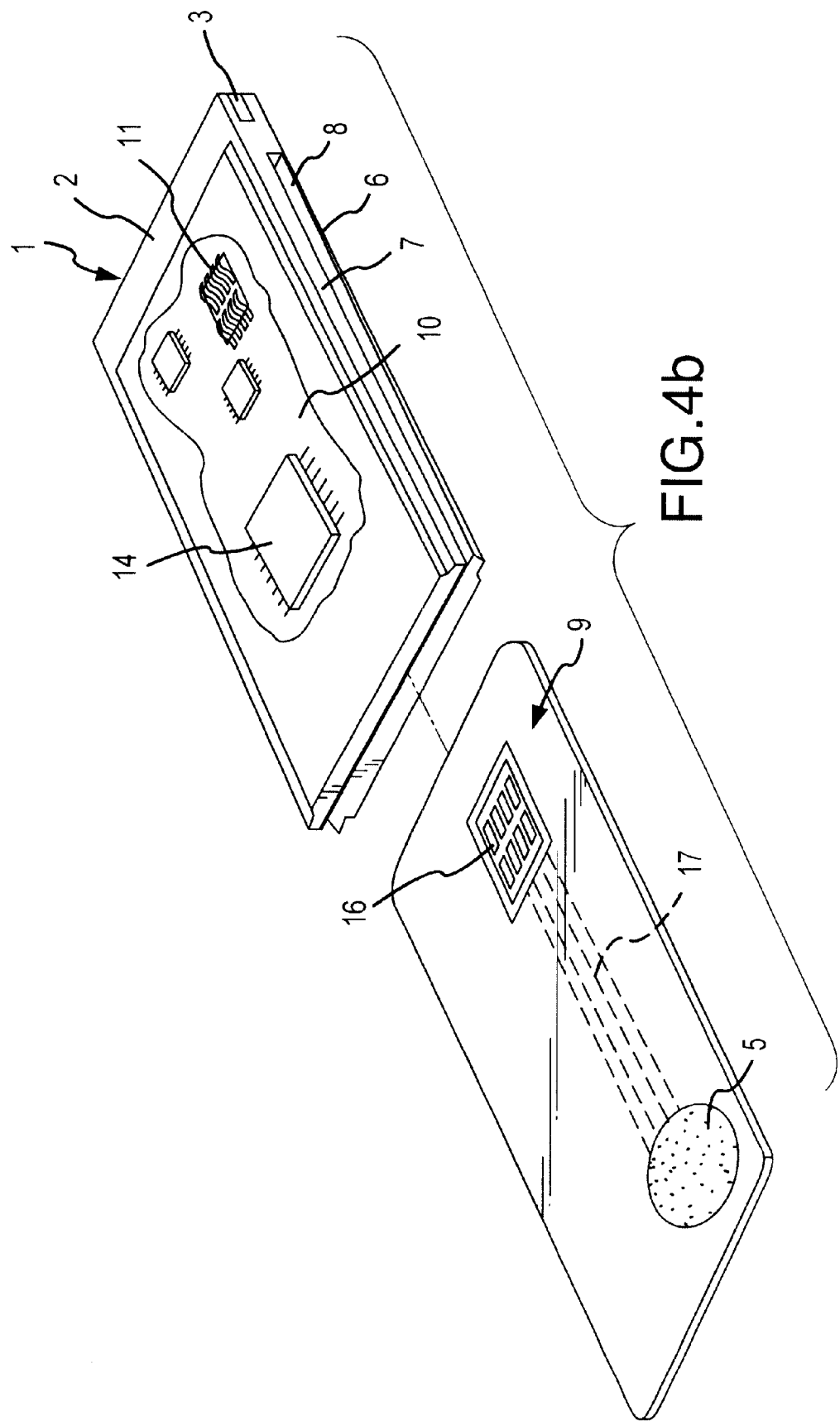
FIG. 4b shows a representation according to FIG. 4a with an alternative arrangement of the sensor on the chip card.

In FIGS. 4a and 4b, PC cards 1 are represented which are also embodied as chip card readers in which the sensor 5 for detecting biometric data is arranged on the chip card 9. The sensor 5 is in both cases embodied as an areal sensor and connected to a contact element that upon insertion into the insertion channel 8 is contacted with the PC card 1. The chip card 9 shown in FIG. 4b is designed such that the sensor 5 is connected with a contact element 16 always present in chip cards by means of a conductive foil 17 arranged on the chip card. Upon insertion of the chip card 9 into the insertion channel 8 the sensor 5 is connected via the contact field 11 arranged at the printed circuit board 10. In the chip card 9 shown in FIG. 4a the sensor 5 is connected with a separate contact element 18 that contacts a contact field 19 arranged at the forward area of the printed circuit board 10. The contact field 19 is embodied as a spring contact. The length of the insertion channel 8 for the PC cards 1 shown in FIGS. 4a and 4b is smaller than the length of the respective chip card 9 so that the chip card 9 with the areal sensor 5 when inserted projects form the PC card 1 so that the accessibility of the sensor 5 for detecting biometric data is ensured.

An alternative possibility of contacting chip cards 9 and PC cards 1 is represented in FIGS. 5a and 5b. Contacting of chip card 9 and PC card 1 is realized without physical contact by radio-technological means. For this purpose, the printed circuit board 10 has an areal antenna 20 which cooperates with an areal antenna 21 on the chip card 9 in order to transmit the required electrical energy from the PC card 1 onto the chip card 9. The sensor 5 on the chip card 9 as well as the cryptographic processor arranged also on the chip card 9 are supplied with electrical energy by the areal antenna 21. The areal antennas 20, 21 are embodied at the same time as a sending and receiving antenna. As is especially illustrated in FIG. 5a, on the printed circuit board 10 at the end opposite the plug connector 3 a sending and receiving unit 22 is provided which cooperates radio-technologically with the sending and receiving unit 21 of the chip card 9. The energy supply is realized preferably via an integrated battery in the chip card 9. This allows a radio-technological data transmission between PC card 1 and one or more chip cards 9 across a great distance. Alternatively, an opto-electronic coupling, for example, by infrared coupling, is possible.

By arranging the sensor 5 for detecting biometric data either on the chip card 9 or on the PC card 1, an authentication system is provided that allows determination of the authenticity of persons or groups of persons. Based on the individual features contained in the biometric data it is possible in a simple manner to realize an unambiguous and reliable identity check which, by excluding unauthorized access, is especially suitable with respect to the requirements of mobile applications of PC cards. By providing a cryptographic processor 14 it is also possible to transform the detected biometric data by a complex cryptographic system into data which are inaccessible to unauthorized persons, while providing persons authorized to use the system the required information for encoding and decoding the data. Accordingly, the inventive authentication system is especially suitable for chip card readers in the form of PC cards which in connection with smart cards allow for a controlled and safe access to data networks or similar facilities. By identifying groups of persons, for example, by successive detection of multiple fingerprints, for which purpose e.g. a plurality of sensors can be arranged on the chip card 9 or the PC card 1, multiple encoding steps can be realized, depending on the desired safety level. A high level of safety is moreover realized in that when using a sensor 5 for detecting biometric data on a slide 4, the movement of the slide 4 can be controlled for an identity check by the provider when communication with a computer via the PC card 1 is established.

The specification incorporates by reference the disclosure of German priority document 298 21 644.2 of Dec. 4, 1998.

The present invention is, of course, in no way restricted to the specific disclosure of the specification and drawings, but also encompasses any modifications within the scope of the appended claims.

What is claimed is:

1. A PC card authentication system comprising:
   a PC card having a PC card housing (2) having a plug connector (3) at one end thereof configured to be inserted into a computer slot of a computer and to provide electrical contact with the computer;
   electronic components mounted in said PC card housing (2) and connected to said plug connector (3);
   a sensor (5) configured to detect biometric data of a person for authenticating the identity of a person;
   a printed circuit board (10) mounted in said PC card housing (2) and having contacts (11, 19) for contacting a chip card (9) inserted into said PC card housing (2), said printed circuit board (10) electrically connected to said plug connector (3);
   wherein said PC card housing (2) comprises a bottom plate (6) and a cover plate (7) connected to one another, wherein said printed circuit board (1) is mounted on said cover plate (7) and wherein between said bottom plate (7) and said printed circuit board (10) an insertion channel (8) for a chip card (9) is defined, wherein said insertion channel (8) opens at an end of said PC card housing (2) opposite said plug connector (3).

2. An authentication system according to claim 1, further comprising a slide (4) slidably mounted in said PC card housing (2) and having an extended position in which said slide (4) projects from PC card said housing (2) and a retracted position in which said slide (4) is completely retracted into said PC card housing (2), said slide (4) arranged at an end of said PC card housing (2) opposite said plug connector (3), wherein said sensor (5) is mounted on said slide (5).

3. An authentication system according to claim 2, wherein said slide (4) has an electrically driven linear guide (12).

4. An authentication system according to claim 2, wherein said slide (4) is supported on a top side of the chip card (9) inserted into said insertion channel (8).

5. An authentication system according to claim 2, wherein said sensor (5) is electrically connected to said printed circuit board (10).

6. An authentication system according to claim 2, wherein said slide (4) is activated and deactivated when the chip card (9) reaches a defined position in said insertion channel (8), when electrical contact of said PC card (1) and the computer is realized, or when the computer emits electrical activation/deactivation signals.

7. An authentication system according to claim 2, further comprising a battery or a storage capacitor mounted in said PC card housing (2) for supplying said slide (4) with electrical energy.

8. An authentication system according to claim 1, wherein said sensor (5) is mounted in said printed circuit board (10) and wherein said PC card housing (2) has a cutout (15) exposing said sensor (5).

9. An authentication system according to claim 1, wherein said sensor (5) is arranged on said chip card (9).

10. An authentication system according to claim 9, wherein the chip card (9) has a contact element (16, 18) and wherein said sensor (5) is electrically connected to said contact element (16, 18), wherein upon insertion of the chip card (9) into said insertion slot (8) said contact element (16, 18) contacts said printed circuit board (10) with or without physical contact.

11. An authentication system according to claim 9, further comprising a sending and receiving unit (22) mounted within said housing at an end opposite said plug connector (3) wherein the chip card (9) has a contact element (16, 18) and wherein said sensor (5) is electrically connected to said contact element (16, 18), wherein said contact element (16, 18) is coupled by opto-electric coupling or by radio-technological coupling to said sending and receiving unit (22).

12. An authentication system according to claim 1, wherein said sensor (5) is activated and deactivated when the chip card (9) reaches a defined position in said insertion channel (8), when electrical contact of said PC card (1) and the computer is realized, or when the computer emits electrical activation/deactivation signals.

13. An authentication system according to claim 1, further comprising a battery or a storage capacitor mounted in said PC card housing (2) for supplying said sensor (5) with electrical energy.

14. A PC card authentication system comprising:
- a PC card having a PC card housing (2) having a plug connector (3) at one end thereof configured to be inserted into a computer slot of a computer and to provide electrical contact with the computer;
- electronic components mounted in said PC card housing (2) and connected to said plug connector (3);
- a sensor (5) configured to detect biometric data of a person for authenticating the identity of a person;
- a printed circuit board (10) mounted in said PC card housing (2) and having contacts (11, 19) for contacting a chip card (9) inserted into said PC card housing (2), said printed circuit board (10) electrically connected to said plug connector (3);
- a cryptographic processor (14) connected to said sensor (5) for encoding and decoding data;
- wherein said PC card housing (2) comprises a bottom plate (6) and a cover plate (7) connected to one another, wherein said printed circuit board (1) is mounted on said cover plate (7) and wherein between said bottom plate (7) and said printed circuit board (10) an insertion channel (8) for a chip card (9) is defined, wherein said insertion channel (8) opens at an end of said PC card housing (2) opposite said plug connector (3).

15. An authentication system according to claim 14, wherein said cryptographic processor (14) is mounted on said printed circuit board (10) or the chip card (9).

* * * * *